United States Patent [19]

Miyawaki

[11] Patent Number: 4,657,522
[45] Date of Patent: Apr. 14, 1987

[54] CONTROL SYSTEM FOR AN INFINITELY VARIABLE TRANSMISSION

[75] Inventor: Motohisa Miyawaki, Chofu, Japan

[73] Assignee: Fuji Jukogyo Kabushiki Kaisha, Tokyo, Japan

[21] Appl. No.: 645,937

[22] Filed: Aug. 30, 1984

[30] Foreign Application Priority Data

Sep. 9, 1983 [JP] Japan .................. 58-166336

[51] Int. Cl.$^4$ ............ B60K 41/14; F16H 11/06; F16H 55/56
[52] U.S. Cl. ..................... 474/12; 74/866; 474/28
[58] Field of Search .............. 74/866; 474/12, 11, 474/18, 28

[56] References Cited

U.S. PATENT DOCUMENTS

| | | | |
|---|---|---|---|
| 4,369,675 | 1/1983 | van Deursen | 474/28 |
| 4,387,608 | 6/1983 | Mohl et al. | 474/12 |
| 4,459,879 | 7/1984 | Miki et al. | 474/28 |
| 4,462,275 | 7/1984 | Mohl et al. | 474/12 |
| 4,487,303 | 12/1984 | Boueri et al. | 74/866 |
| 4,506,563 | 3/1985 | Hiramatsu | 74/866 |

FOREIGN PATENT DOCUMENTS 0005565 11/1979 European Pat. Off. .

Primary Examiner—Stuart S. Levy
Assistant Examiner—Joseph J. Hail, III
Attorney, Agent, or Firm—Martin A. Farber

[57] ABSTRACT

A control system for an infinitely variable belt-drive transmission comprises a primary pulley having a hydraulically shiftable disc, a secondary pulley having a hydraulically shiftable disc, a belt engaged with both pulleys, and a hydraulic circuit having a pump for supplying oil. A transmission ratio control valve is provided to be responsive to engine speed for controlling the oil and for shifting the disc of the primary pulley to change the transmission ratio, and a pressure regulator valve is provided to respond to the transmission ratio for increasing the pressure of the oil with an increase of the transmission ratio. A pickup is provided to produce pulses dependent on engine speed, and a electric circuit is responsive to the pulses for producing pulses. An electromagnetic valve is provided to respond to the pulses for draining the oil applied to the transmission ratio control valve thereby controlling the valve so as to provide at least two transmission ratio characteristics.

4 Claims, 6 Drawing Figures

CONTROL SYSTEM FOR AN INFINITELY VARIABLE TRANSMISSION

BACKGROUND OF THE INVENTION

The present invention relates to a control system for an infinitely variable belt-drive transmission for a vehicle, and more particularly to a system for changing the speed ratio or transmission ratio control characteristic. European Patent No. EP-A-0005565 discloses a control system for an infinitely variable transmission.

The infinitely variable belt-drive transmission comprises an endless belt running over a primary pulley and a secondary pulley. Each pulley comprises a movable conical disc which is axially moved by a fluid operated servo device so as to vary the running diameter of the belt on the pulley depending on driving conditions. The system is provided with an oil pressure regulator valve and a transmission ratio control valve. Each valve comprises a spool to control the oil by shifting the spool.

The primary pulley has a Pitot pressure generating device for producing Pitot pressure dependent on engine speed. The Pitot pressure is applied to one axial end of the spool of each valve to bias the spool. On the other hand, the actual transmission ratio is detected by the axial position of the movable conical disc of the primary pulley which represents the running diameter of the belt on the primary pulley. The position of the movable conical disc is transmitted to the other axial end of the spool of the pressure regulator valve by a rod and a link.

The spool of the transmission ratio control valve is shifted in dependency on the opening degree of a throttle valve of an engine and on engine speed to control the amount of oil supplied to the servo device of the primary pulley so as to control the transmission ratio. The spool of the oil pressure regulator valve is shifted in dependency on the engine speed, the pressure in the servo device of the secondary pulley and on the transmission ratio to regulate the pressure of the line oil. Thus, the transmission ratio can be smoothly and infinitely varied.

In the system, the opening degree of the throttle valve is transmitted to a cam, so that the lift of the cam may represent the opening degree of the throttle valve. Accordingly, the lift of the cam and the opening degree of the throttle valve is in constant relation. On the other hand, the relationship between the Pitot pressure and the engine speed is also fixed. Therefore, the transmission ratio control characteristic of the system is absolutely determined by the engine speed and the opening degree of the throttle valve regardless of driving conditions of the vehicle, such as flat road driving, uphill driving. Accordingly, the vehicle can not be driven at a suitable transmission ratio depending on driving conditions.

In addition, the Pitot pressure varies according to a second degree curve of the engine speed, in which the Pitot pressure does not change much in a low engine speed range. Accordingly, the control of the transmission ratio is not reliably performed out in a low engine speed range.

SUMMARY OF THE INVENTION

The object of the present invention is to provide a control system for an infinitely variable transmission in which the transmission ratio characteristic can be selected according to driving conditions, whereby fuel economy and driveability of a vehicle can be improved.

According to the present invention, there is provided a control system for an infinitely variable transmission for transmitting the power of an internal combustion engine mounted on a vehicle, the transmission comprising a primary pulley having a hydraulically shiftable disc and a hydraulic cylinder for shifting the disc, a secondary pulley having a hydraulically shiftable disc and a hydraulic cylinder for operating the disc, a belt engaged with both pulleys, a hydraulic circuit having a pump for supplying oil, a transmission ratio control valve responsive to the pressure of the oil in dependency on engine speed for controlling the supply of the oil and for shifting the disc of the primary pulley to change the transmission ratio, and a pressure regulator valve responsive to the transmission ratio for controlling the pressure of the oil. The system comprises means responsive to the engine speed for producing an electric signal, an electric circuit, including a range change means, responsive to said electric signal for producing control signals, an electromagnetic valve responsive to said control signals for changing said pressure applied to said transmission ratio control valve and for actuating the valve so as to provide at least two transmission ratio characteristics.

The other objects and features of this invention will be apparently understood from the following description with reference to the accompanying drawings.

DETAILED DESCRIPTION OF THE PREFERRED EMBODIMENT

Figure 1:
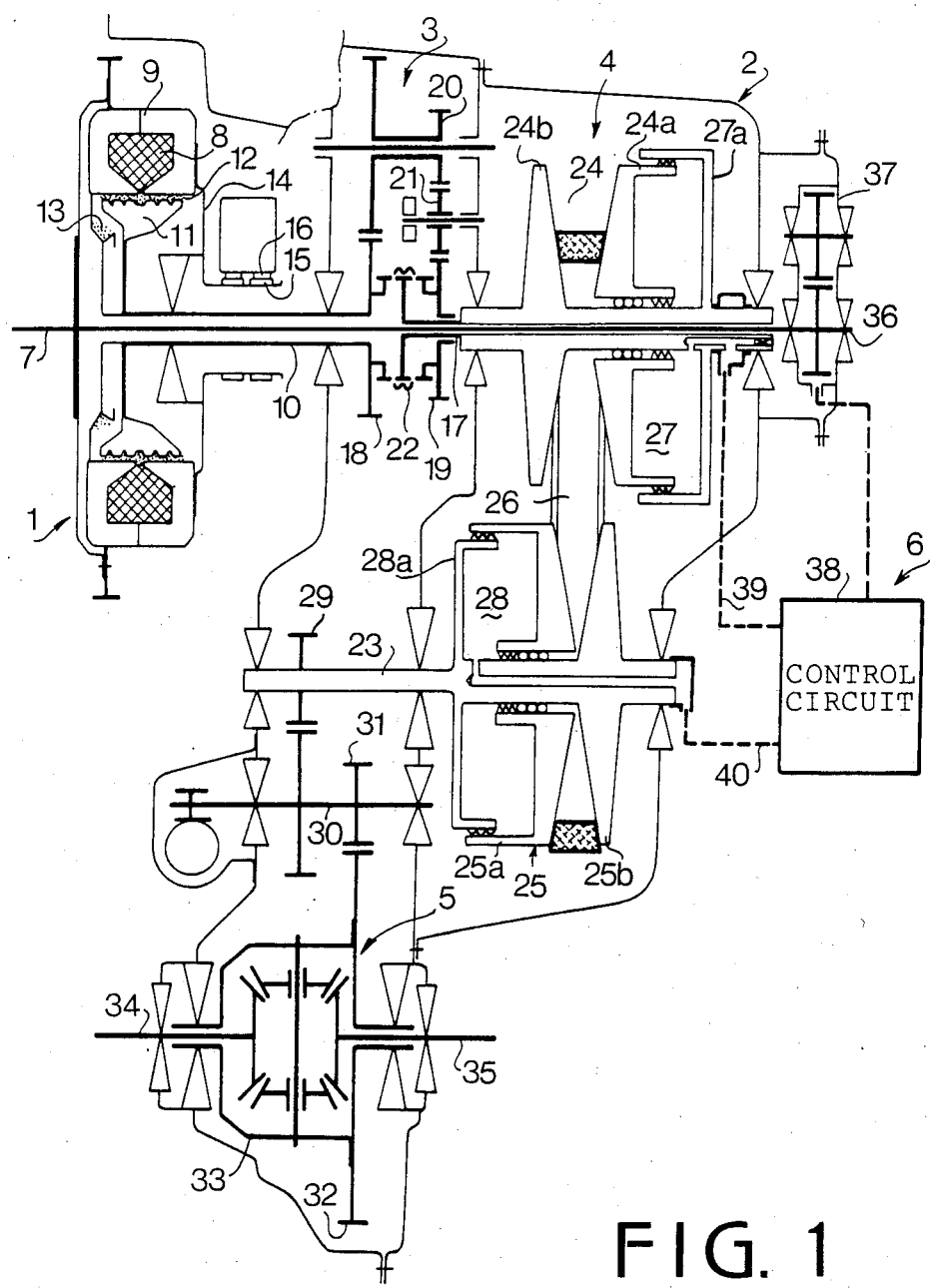
FIG. 1 is a schematic illustration of an infinitely variable belt-drive transmission, to which the present invention is applied.

Referring to FIG. 1, the infinitely variable belt-drive automatic transmission for a vehicle to which the present invention is applied, comprises an electromagnetic powder clutch 1, an infinitely variable belt-drive transmission 2, a selector mechanism 3, pulleys and a belt device 4, a final reduction device 5, and pressurized oil control circuit 6. The crankshaft 7 of an engine (not shown) is connected to an annular drive member 9 of the electromagnetic powder clutch 1. The electromagnetic powder clutch comprises a magnetizing coil 8 provided in the drive member 9, a driven member 11 having its outer periphery spaced from the inner periphery of the drive member 9 by a gap 12, and a powder chamber 13 defined between the drive member 9 and driven member 11. The powder chamber 13 is filled with magnetic powder material. The driven member 11 is secured to an input shaft 10 of the belt-drive transmission. A holder 14 secured to the drive member 9 carries slip rings 15 which are electrically connected to the magnetizing coil 8. The coil 8 is supplied through brushes 16 and slip rings 15 with control current from a electronic control circuit.

When the magnetizing coil 8 is excited by clutch current, drive member 9 is magnetized to produce a magnetic flux passing through the driven member 11. The magnetic powder is aggregated in the gap 12 by the magnetic flux and the driven member 11 is engaged with the drive member 9 by the powder. On the other hand, when the clutch current is cut off, the drive and driven members 9 and 11 are disengaged from one another.

In the belt-drive transmission 2, the selector device 3 is provided between the input shaft 10 and a main shaft 17. The main shaft 17 is cylindrical and is disposed coaxially to the input shaft 10. The selector device 3 comprises a drive gear 18 integral with the input shaft 10, a reverse driven gear 19 rotatably mounted on the main shaft 17, and a synchronizer 22 mounted on the main shaft 17. The drive gear 18 meshes with one of gears of a counter gear assembly 20. Another gear of the counter gear assembly 20 engages with an idler gear 21, which in turn engages with the driven gear 19.

The synchronizer 22 has a well known mechanism and comprises a hub secured to the main shaft 17, and a synchronizer sleeve slidably engaged with the hub with splines. The synchronizer sleeve is adapted to engage with splines of the drive gear 18 or with splines of the driven gear 19.

At a neutral position (N range) of a selector lever (not shown), the synchronizer 22 does not engage either gear, so that the main shaft 17 is disconnected from the input shaft 10. When the synchronizer is engaged with the gear 18, the input shaft 10 is connected to the main shaft 17 through the synchronizer to provide a driving position (D range).

When the synchronizer is engaged with the reverse driven gear 19, the input shaft 10 is connected to the main shaft 17 through gears 18, 20, 21 and 19 to provide a reverse driving position (R range).

The main shaft 17 has an axial passage in which an oil pump driving shaft 36 connected to crankshaft 7 is mounted. An output shaft 23 is provided in parallel with the main shaft 17. A primary pulley 24 and a secondary pulley 25 are mounted on shafts 17 and 23 respectively. A fixed conical disc 24b of the primary pulley 24 is integral with the main shaft 17 and an axially movable conical disc 24a is axially slidably mounted on the main shaft 17. The movable conical disc 24a also slides in a cylinder 27a formed on the main shaft 17 to provide a servo device 27. A chamber of the servo device 27 communicates with an oil pump 37 through a passage 39 and a pressure oil control circuit 38. The oil pump 37 is driven by the shaft 36.

A fixed conical disc 25b of the secondary pulley 25 is formed on the output shaft 23 opposite the movable disc 24a and a movable conical disc 25a is slidably mounted on the shaft 23 opposite the disc 24b. Movable conical disc 25a has a cylindrical portion in which a piston portion 28a of the output shaft 23 is slidably engaged to form a servo device 28. A chamber of the servo device 28 is communicated with the oil pump 37 through a passage 40 and the control circuit 38. A drive belt 26 engages with the primary pulley 24 and the secondary pulley 25.

Secured to the output shaft 23 is a drive gear 29 which engages with an intermediate reduction gear on an intermediate shaft 30. An intermediate gear 31 on the shaft 30 engages with a final gear 32. Rotation of the final gear 32 is transmitted to axles 34 and 35 of the vehicle driving vehicle wheels (not shown) through a differential 33.

The pressure oil control circuit 38 is responsive to engine speed and throttle valve position for controlling the pressurized oil supply to servo devices 27 and 28 thereby moving discs 24a and 25a. Thus, the transmission ratio is infinitely changed.

Figure 2:
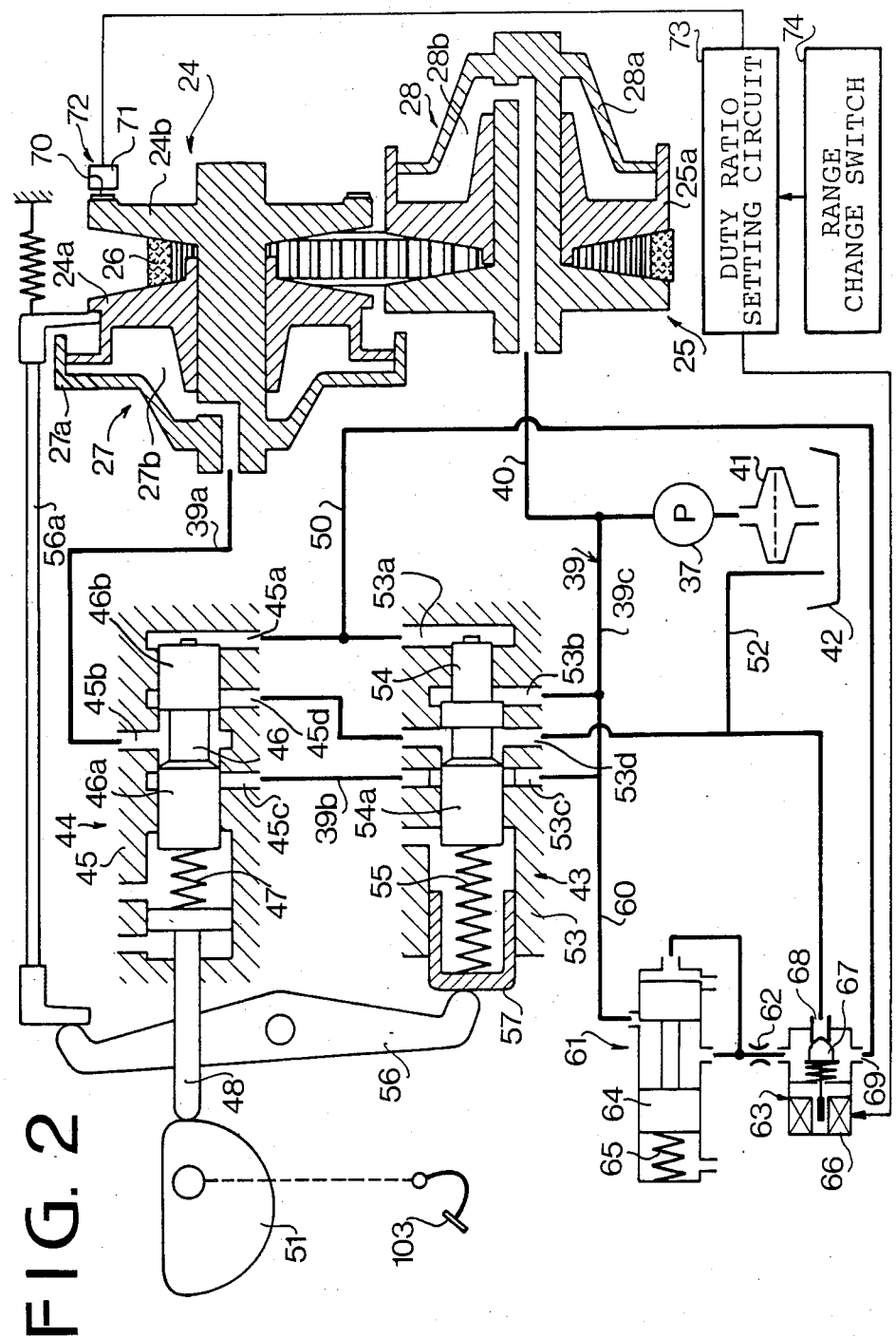
FIG. 2 is a schematic diagram showing a control system according to the present invention.

Referring to FIG. 2, the chamber 27b of servo device 27 is applied with pressurized oil by the oil pump 37 from an oil reservoir 42 passing through a filter 41, conduit 39, pressure regulator valve 43 and transmission ratio control valve 44. The chamber 28b of servo device 28 is applied with pressurized oil through conduit 40 without passing through valves 43 and 44. The movable conical disc 24a is so designed that its pressure receiving area is larger than that of movable conical disc 25a.

The transmission ratio control valve 44 comprises a valve body 45, spool 46, spring 47 for urging the spool in the downshift direction, and an actuating member 48 for the spool 46 and the spring 47. The actuating member 48 engages a shift cam 51. The shift cam 51 is operatively connected to an accelerator pedal 103 of the vehicle so as to be rotated in dependency on the magnitude of depression of the pedal 103. A port 45b of the valve 44 is selectively communicated with a pressure oil supply port 45c or a drain port 45d in accordance with the position of lands 46a and 46b of spool 46. Port 45b communicates with chamber 27b through a conduit 39a, and port 45c communicates with the pressure regulator valve 43 through a conduit 39b. The drain port 45d communicates with the oil reservoir 42 through a port 53d and conduit 52. An end chamber 45a is applied with oil pressure depending on engine speed from a solenoid operated valve 63 through a passage 50, as described hereinafter.

Thus, the spool 46 is shifted in dependency on the oil pressure dependent on the engine speed and on the pressure by the spring 47 dependent on the opening degree of the throttle valve operatively connected to the accelerator pedal 103. The amount of oil supplied to the chamber 27b increases with an increase of engine speed and with a decrease of the opening degree of the throttle valve to upshift.

The pressure regulator valve 43 comprises a valve body 53, spool 54, and a spring 55 for urging the spool 54 in one direction. The spool 54 is applied with oil pressure supplied through conduit 39 and a port 53b, so that the spool 54 is moved to the left by the oil pressure at the port 53b. One end of the spring 55 engages with a slidable spring retainer 57 which is moved by an arm 56 and rod 56a. The rod 56a engages the disc 24a for detecting the transmission ratio during operation. A port 53c connected with conduit 39c is communicated with the conduit 39b and selectively communicated with the drain port 53d in accordance with the position of a land 54a.

An end chamber 53a is applied with oil pressure from the solenoid operated valve 63. Accordingly, the spool 54 is applied with the oil pressure, with the pressure applied to the chamber 28b, and with the pressure of the spring 55 dependent on the transmission ratio. When the engine speed increases, the rod 56a moves to the right to turn the arm 56 in the clockwise direction. Thus, the spool 54 is shifted to the left to communicate port 53c with drain port 53d. Accordingly, the line pressure decreases, thereby performing the upshift operation of the transmission.

In the system of the present invention, the oil supply line 39c from the oil pump 37 is communicated with a pressure controlling valve 61 through a passage 60. The pressure controlling valve 61 comprises a spool 64 and a spring 65 and is so arranged as to maintain the line pressure at a constant value. The pressure controlling valve 61 is communicated with the solenoid operated valve 63 through an orifice 62. The valve 63 comprises a solenoid 66, a valve body 67 operated by the solenoid, a drain port 68 closed by the valve body 67, and a port 69 connected to the passage 50.

On the other hand, the fixed conical disc 24b has a plurality of projections 70 annularly provided on the outside thereof. An engine speed sensor 72 as a magnetic pickup 71 is provided adjacent the projections 70. The output signal of the engine speed sensor 72 is applied to a duty ratio setting circuit 73. The duty ratio setting circuit 73 is applied with a signal from a range change switch 74 and adapted to produce a signal to operate the solenoid 66.

Figure 3:
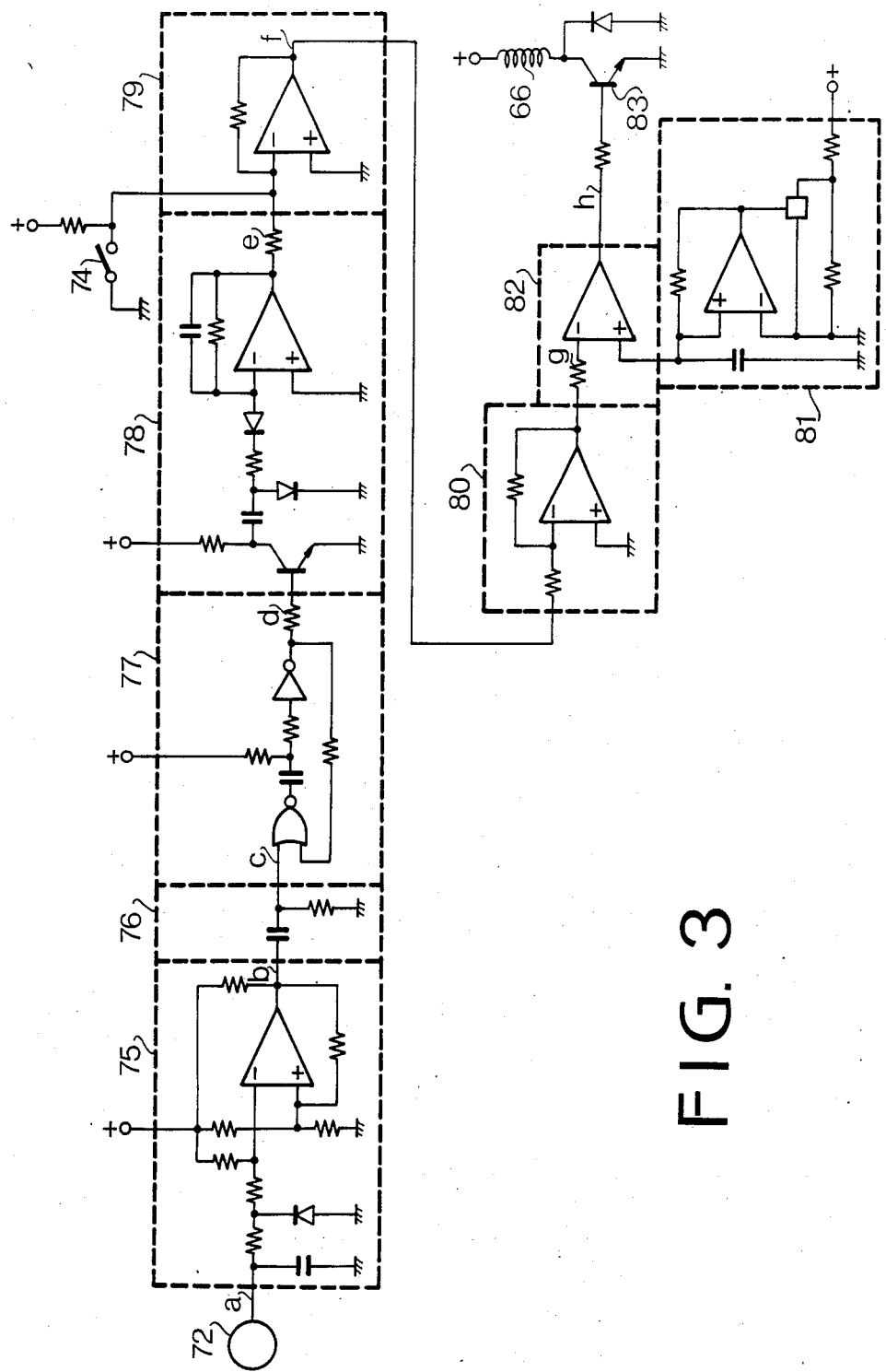
FIG. 3 is an electronic control circuit used in the control system.

Referring to FIG. 3, output pulses of the engine speed sensor 72 are shaped by a waveform shaping circuit 75 to square pulses. The duty ratio setting circuit 73 comprises a differentiating circuit 76 applied with the square pulses, a monostable multivibrator 77, a frequency-to-voltage (F/V) converter 78 and an adding circuit 79 for adding the output of the F/V converter 78 and the output of the range change switch 74.

Figure 4:
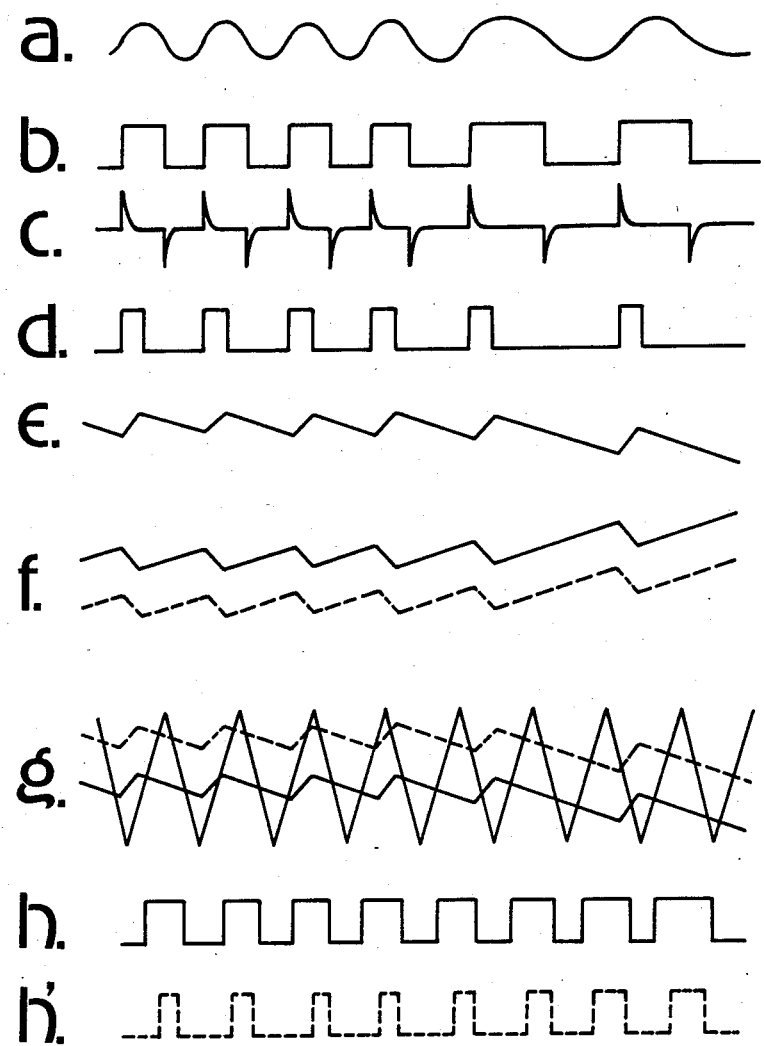
FIG. 4 shows waveforms at various positions of the circuit of FIG. 3.
Figure 5:
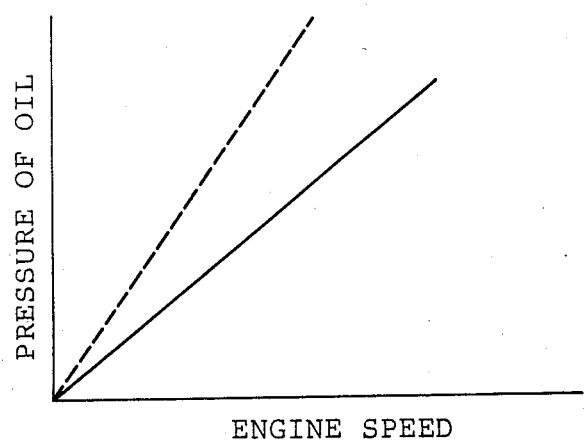
FIG. 5 a graph showing the relationship between engine speed and oil pressure.

The output of the engine speed sensor 72 (FIG. 4(a)) is shaped to square pulses (FIG. 4(b)) by the waveform shaping circuit 75, the output of which is converted to trigger pulses (c) by the differentiating circuit 76. Positive going trigger pulses (c) actuate the monostable multivibrator 77, so that the multivibrator produces pulses (d), the pulse spacing of which increases with a decrease of the engine speed. The pulses are converted to an analog signal (e) by the F/V converter 78. When the range change switch 74 is closed, a voltage is added to the signal (e), so that the output (f) of the adder 79 becomes high as shown by solid line. The output (f) is inverted by an inverter (80). The inverted high or low signal (g) is compared with a triangular pulse train from a triangular pulse generating circuit 81 by a comparator 82. The comparator 82 produces output pulses (h) each having a large duty ratio or a large pulse width by the comparison between the low signal (g) and the triangular pulse train and produces output pulses (h') each having a small duty ratio or a small pulse width as a result of comparison between the high signal (g) and the triangular pulse train. Each pulse (h or h') causes a transistor 83 to turn on to energize the solenoid 66. When the solenoid 66 energizes, the valve body 67 is moved toward the solenoid to open the drain port 68. Accordingly, as the engine speed decreases, the amount of drain oil from the valve 63 increases, and the line pressure in the passage 50 decreases. When the line pressure in the passage 50 decreases, the spool 54 of the pressure regulator valve 43 moves to the right, which causes the line pressure to increase. The solid line in the graph of FIG. 5 shows the relationship between the engine speed and the line pressure during the closing of the range change switch 74.

When the range change switch 74 is turned off, the pulses (h') each having a small pulse width turn on the transistor 83. Thus, the line pressure in the passage 50 increases. The dotted line in FIG. 5 shows the variation of the line pressure during the opening of the range change switch.

Figure 6:
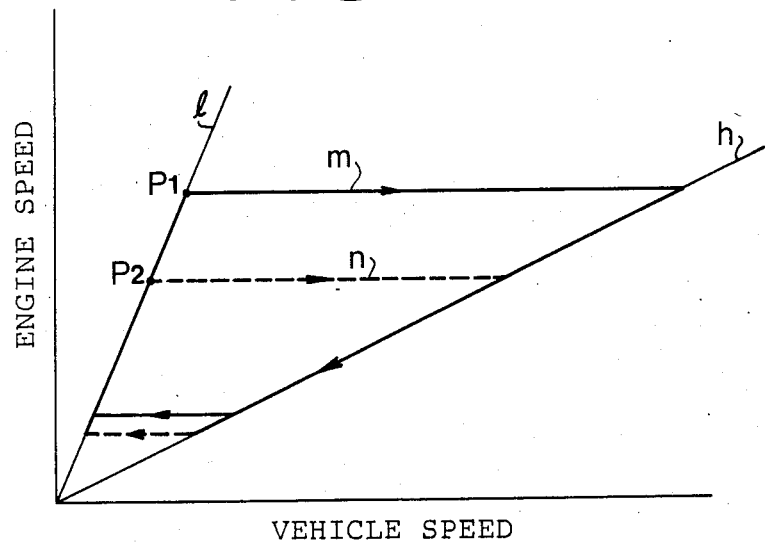
FIG. 6. shows transmission ratio control characteristics of the infinitely variable transmission.

FIG. 6 shows the transmission ratio control characteristics of the system. In the graph, line l represents the highest transmission ratio line and h represents the lowest transmission ratio line. Since the transmission ratio is kept at the highest transmission ratio, engine speed and vehicle speed increase along the line l. When the range change switch 74 is turned on, the pressure in the end chamber 45a of the transmission ratio control valve 44 is lowered. Accordingly, the spool 46 of the valve 44 is not shifted to the left so as to supply the oil in the chamber 27b, until the engine speed reaches a high value. When the engine speed reaches a point $P_1$, the spool 46 is shifted to the left, so that the transmission ratio begins to go to a low value (upshifting). Thus, only vehicle speed increases with a decrease of the transmission ratio along line m.

On the other hand, when the range change switch 74 is turned off, the line pressure rises. Accordingly, the transmission ratio begins to change at a low engine speed point $P_2$ and changes along a line n.

From the foregoing, it will be understood that the duration of the highest transmission ratio during the ON state of the range change switch 74 is longer than the OFF state. In other words, the ON state of the switch provides a power transmission ratio characteristic and the OFF state provides an economy transmission ratio characteristic.

Although, in the embodiment of the present invention, two transmission ratio characteristics are provided, the system can be arranged to provide two or more characteristics.

In accordance with the present invention, a control system which has various transmission ratio characteristics can be provided so as to improve fuel economy and driveability of a vehicle.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. In a system for controlling the transmission ratio of an infinitely variable transmission for transmitting power of an internal combustion engine, the transmission comprising a primary pulley having a hydraulically shiftable disc and a hydraulic cylinder for shifting the disc, a secondary pulley having a hydraulically shiftable disc and a hydraulic cylinder for operating the disc, and a belt engaged with both of the pulleys, the system comprising a first hydraulic circuit means having a pump for supplying pressurized oil, and a transmission ratio control valve having a spool responsive to speed of the engine for controlling the pressurized oil so as to move the disc of the primary pulley to change the transmission ratio, the improvement comprising:

a second hydraulic circuit means for applying control oil to one end of the spool of the transmission ratio control valve so as to axially move the spool;

an electronic control circuit means responsive to first pulses proportional to the speed of said engine for producing a first output signal dependent on the engine speed;

the electronic control circuit means including range change means, the latter for causing the electronic control circuit means to produce a second output signal dependent on said engine speed;

the second hydraulic circuit means including a modulator valve for producing constant pressure control oil; and the second hydraulic circuit means including an electromagnetic valve having a coil responsive to said first output signal and said second output signal, respectively, for draining a part of the constant pressure control oil so as to control the control oil applied to the end of the spool of the transmission ratio control valve, thereby controlling the transmission ratio.

2. The control system according to claim 1 wherein said producing means of said electronic control circuit means is a pickup and said range change means is for producing said second output signal as second pulses dependent on said first pulses, and said electromagnetic valve comprises means responsive to said first and second pulses, respectively, so as to drain a part of the control oil applied to the transmission ratio control valve.

3. The control system according to claim 1, wherein said second hydraulic circuit means receives the pressurized oil from said first hydraulic circuit means, and said modulator valve of said second hydraulic circuit means for producing said constant pressure control oil from the pressurized oil received by said second hydraulic circuit means.

4. The control system according to claim 1, wherein said modulator valve is self-controlling comprising:

a displaceable spool defining a control oil flow-through chamber having an output port producing the constant pressure control oil and communicating with said electromagnetic valve and an input port communicating with the pressurized oil from said first hydraulic circuit means, the opening of said input port into said flow-through chamber being variable upon displacement of said spool;

means for constantly biasing said spool for displacement in a first direction; and said spool further defines another chamber operatively commnicating with said output port so as to exert a biasing force on said spool in a direction opposite to said first direction.

* * * * *